Patented Jan. 30, 1923.

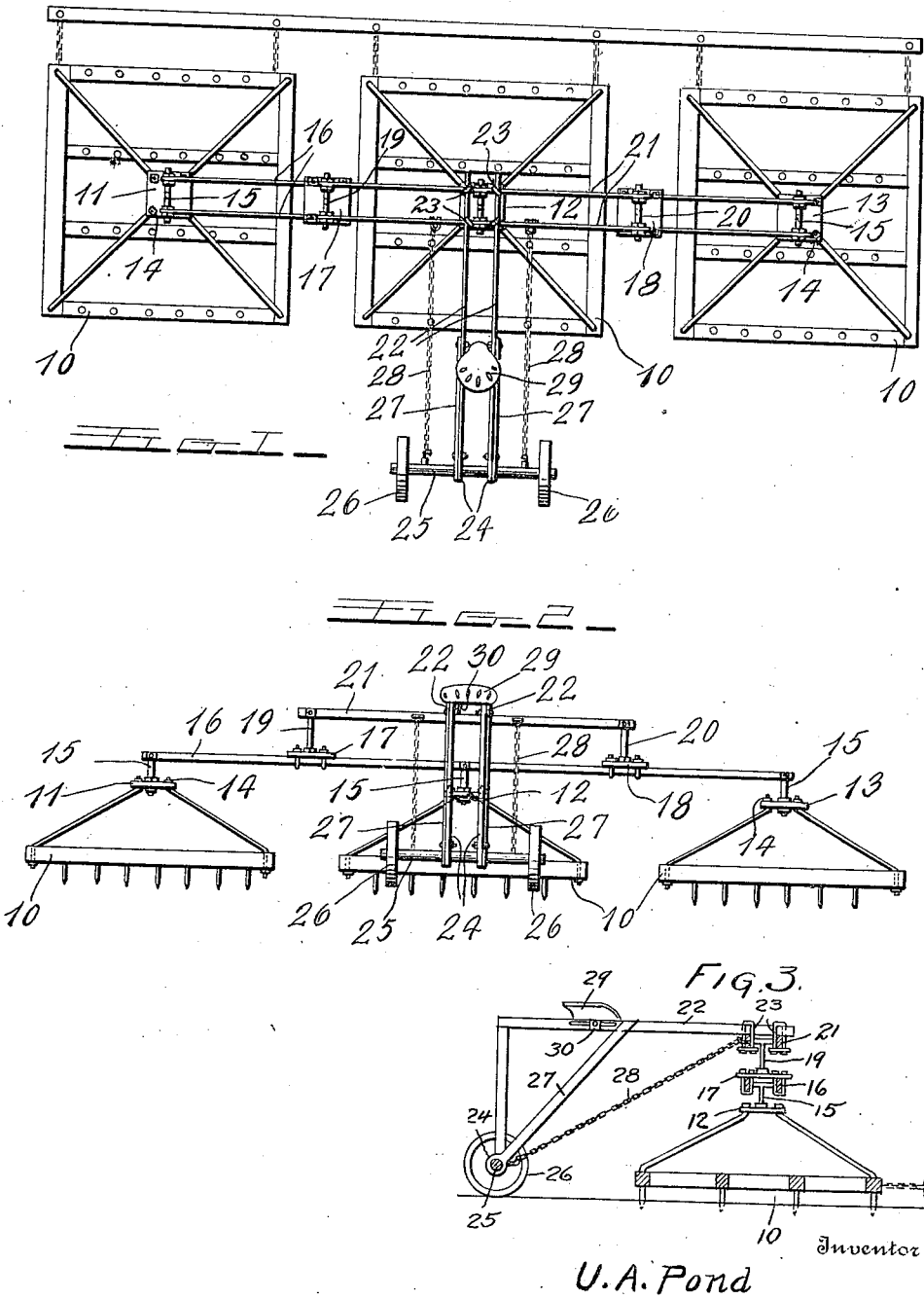

1,443,589

UNITED STATES PATENT OFFICE.

ULYSSES A. POND, OF MIDDLETOWN, ILLINOIS.

HARROW CART.

Application filed September 27, 1920. Serial No. 413,113.

*To all whom it may concern:*

Be it known that I, ULYSSES A. POND, citizen of the United States, residing at Middletown, in the county of Logan and State of Illinois, have invented certain new and useful Improvements in Harrow Carts, of which the following is a specification.

The present invention relates to improvements in harrow attachments and more particularly to an improved cart which may be connected to conventional harrows of the gang type and which when in place will provide a seat for the operator of the car and means through which horses or other propelling means for the harrow may be hitched or attached.

The principal object of my invention is to provide a cart or attachment for harrows which may be quickly and easily attached to the harrow and which when in place provides for proper distribution of the weight of the operator on the harrow by means of a longitudinally adjustable seat, the provision of the seat greatly adding to the comfort of the operator and at the same time providing means whereby the horses or other propelling means for the harrow may be hitched or attached.

Various other objects and advantages of my invention will become apparent during the continuance of the following description.

In the drawings:

Figure 1 is a view in top plan showing my invention as in place in connection with a harrow of conventional type.

Figure 2 is a view in rear elevation of my invention and,

Figure 3 is a side view illustrating the brace, chains, and adjustable features of the invention.

In the drawings, I have shown my invention in connection with a harrow consisting of three sections designated by the numeral 10, each section having a retaining plate firmly secured thereto, the plates being designated by the numerals 11, 12 and 13 respectively and secured in place by such means as shown at 14. Substantially T-shaped supports 15 project upwardly from the plates 11, 12 and 13, the upper part of the T portion alined in a substantially horizontal plane above the harrow sections.

At their upper ends the supports 15 are connected by a transversely extending connecting member 16 which firmly secures the harrow sections in place. Mounted on the connecting member 16 is an adjustable truss comprising plates 17 and 18 suitably fastened to the connecting member so as to be adjustable lengthwise thereon and provided with supports 19 and 20 respectively to which are connected the ends of the truss frame 21. A seat carrying frame 22 is connected at one end of the adjustable truss by U bolts or other suitable fastening elements 23 capable of being loosened to permit adjustment of the seat frame longitudinally of the truss, the other end of the truss being provided with a depending bolster support 24 which engages and rests on axle 25, the latter in turn being supported by wheels 26.

In order to firmly support the seat carrying frame 22 a brace member 27 is run from the axle 25 to the seat frame 22, the connection between the spacing member 27 and the seat frame 22 being at a point substantially intermediate the end of the seat frame 22 as clearly shown in the drawing.

Chains or other connecting members 28 connect the axle 25 with the truss frame 21. When in operation the chains or other connecting members 28 absorb the greater amount of strain exerted by the wheels 26 travelling over the surface of the ground.

On the bar 22 I provide a seat 29 for the operator of the car which is adjustable longitudinally on the bar as indicated by the numeral 30, the purpose of this adjustment being to enable the weight of the operator to be properly distributed on the harrow according to the circumstances. It will be observed that by adjusting the seat forwardly the greater part of the operator's weight is upon the center section of the harrow while moving the seat rearwardly the weight of the operator is on the wheels 26 instead of the harrow.

From the foregoing it is believed that the advantages and novel features of my invention will be readily understood and therefore further detailed description is deemed unnecessary.

What is claimed is:

1. A device of the character described including in combination, a series of harrow units, means connecting said harrow units, a truss carried by and in vertically spaced relation to said connecting means, a carrying bar having its forward end adjustably secured to said member, means including a pair of wheels to support the rear end of said bar, and an operator's seat mounted on said bar substantially as described.

2. A device of the character described including in combination, a series of harrow units, means connecting said harrow units, supports adjustably positioned on said connecting means, a member connecting said supports and arranged in spaced relation to said connecting means, a carrying bar having one end connected to said member, an axle, wheels supporting said axle, a bolster on said axle, means connecting said bolster and the other end of said carrying bar, and an operator's seat adjustably mounted on said carrying bar substantially as described.

In testimony whereof I affix my signature in presence of two witnesses.

ULYSSES A. POND.

Witnesses:
C. J. BRODEN,
FLOYD RAYBURN.